United States Patent [19]

Wong et al.

[11] 3,917,856
[45] Nov. 4, 1975

[54] REFRIGERATED CORN BREAD DOUGH
[75] Inventors: Carl Y. Wong; William L. Murphy, both of Minneapolis, Minn.
[73] Assignee: The Pillsbury Company, Minneapolis, Minn.
[22] Filed: Dec. 5, 1973
[21] Appl. No.: 422,043

[52] U.S. Cl. ................ 426/94; 426/128; 426/153; 426/345; 426/502; 426/516; 426/811
[51] Int. Cl. .................... A21d 8/02; A21d 13/04
[58] Field of Search ........ 426/90, 94, 95, 128, 153, 426/345, 346, 502, 138, 516, 811; 99/90 R

[56] References Cited
UNITED STATES PATENTS

| | | | |
|---|---|---|---|
| 2,264,115 | 11/1941 | Grainger et al. | 426/502 X |
| 2,942,988 | 6/1960 | Erekson et al. | 426/153 |
| 3,212,903 | 10/1965 | Oberholtzer | 426/128 |
| 3,276,397 | 10/1966 | Poppe et al. | 426/502 X |
| 3,428,461 | 2/1969 | Hatton et al. | 426/152 |
| 3,438,791 | 4/1969 | Matz | 426/344 X |
| 3,524,401 | 8/1970 | Hosfield et al. | 426/95 |

Primary Examiner—S. Leon Bashore
Assistant Examiner—Marc L. Caroff
Attorney, Agent, or Firm—Michael D. Ellwein; James V. Harmon

[57] ABSTRACT

A refrigerated corn bread dough that is storage stable at refrigerated temperatures for at least 45 days is provided herein. The corn bread dough is divided into biscuit-like dough pieces and packed in refrigerated dough containers. Each biscuit-like dough piece is comprised of a top and bottom layer of a first dough and an inner layer of a second dough. The first dough is divided equally between the top and bottom layers and comprises from 10% to 30% by weight of the total dough piece. This first dough is substantially undeveloped but is sufficiently cohesive to form a dough sheet. The second dough comprises from 70% to 90% by weight of the total dough piece and contains a substantial amount of cornmeal. The second dough is undevelopable because of the large amount of particulate matter contained therein. The first dough which partially enrobes the second dough is used to maintain the integrity of the biscuit-like dough piece and facilitates separation of the dough pieces upon removal from the refrigerated dough container.

A process for preparing the corn bread dough is also disclosed herein. In this process, the layers are sequentially extruded, one on top of the other. In this process, the doughs must be substantially undeveloped to be extruded yet the first dough must be sufficiently cohesive to form a dough sheet and maintain the integrity of the biscuit-like dough pieces.

17 Claims, 3 Drawing Figures

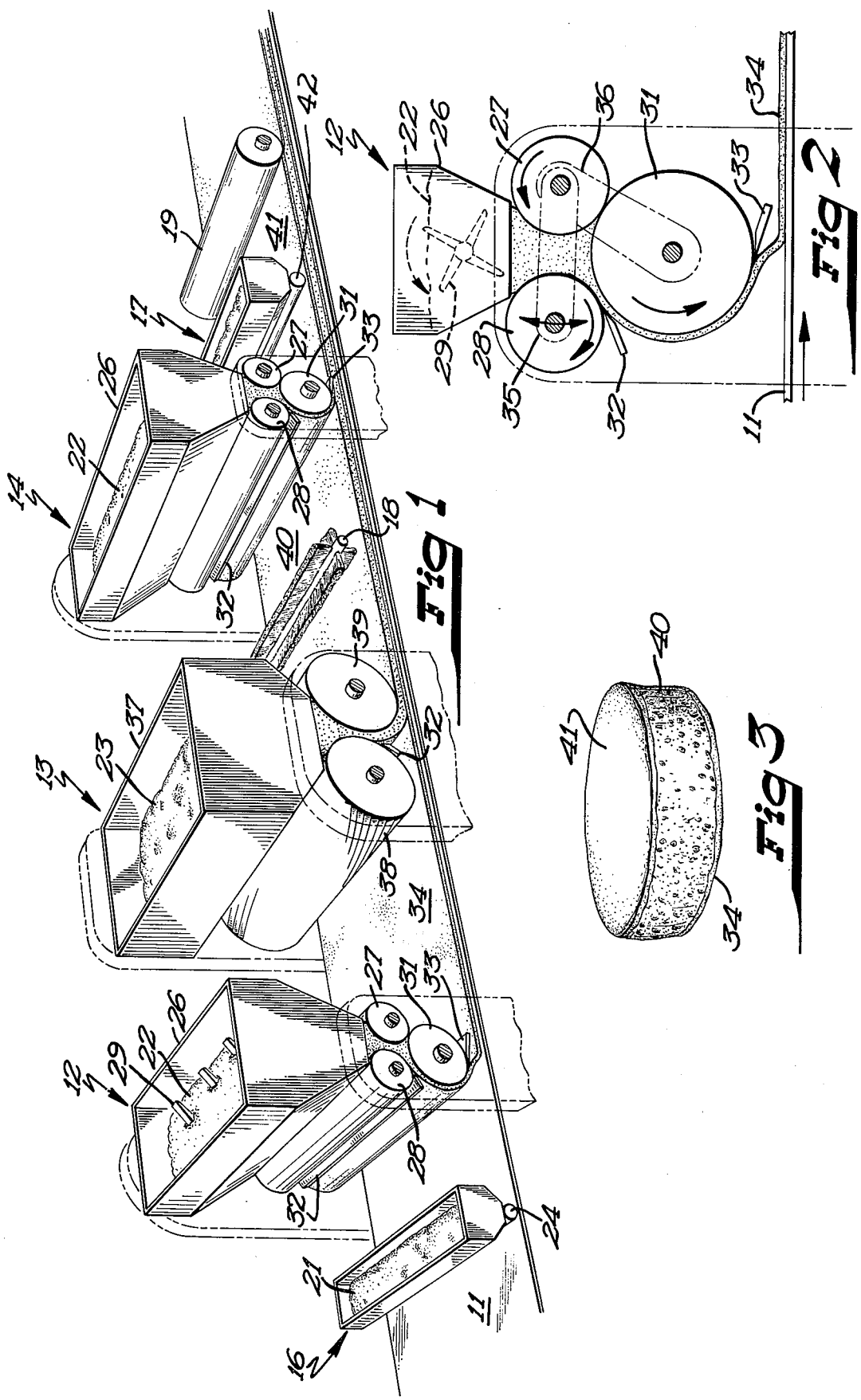

REFRIGERATED CORN BREAD DOUGH

BACKGROUND OF THE INVENTION

This invention relates to a packaged corn bread dough which is divided into biscuit-like dough pieces and a process for making this dough. The dough is specially formulated and processed to provide stability during refrigerated storage, ease of handling during preparation for baking, and a baked product closely resembling homemade corn bread in texture and flavor.

The following recipe is typical of many existing corn bread recipes. In this recipe, the components are combined by adding all of the liquid ingredients to the combined dry ingredients and stirring the mixture until a smooth batter is formed.

| INGREDIENTS | AMOUNT |
| --- | --- |
| All-purpose flour | 1 cup |
| Cornmeal | 1 cup |
| Milk | 1 cup |
| Shortening (melted) | ¼ cup |
| Eggs (slightly beaten) | 2 |
| Sugar | 2 teaspoons |
| Salt | .1 teaspooon |
| Baking powder | 4 teaspoons |

The batter is then poured into an 8-inch or 9-inch pan and baked at 425°F. for 20 to 25 minutes. The product is crumbly and the grain coarse and open, more cake-like than bread-like. The product is moist, tender and slightly gritty in the mouth as opposed to dry, tough and chewy. The external top surface is desirably smooth.

In some parts of the United States, a much sweeter corn bread is desired. These sweet corn breads, on a finished product basis, contain up to 14% sugar. The color of the cornmeal used therein is also important; some communities prefer white cornmeal while others prefer yellow cornmeal.

Corn bread mixes have been marketed for many years. These mixes generally combine the ingredients shown above in their dry form and require the addition of milk or water and an egg. The dry ingredients are mixed with the additional liquid to form a batter and the batter is baked in the ordinary manner.

A further improvement and convenience is exemplified by the refrigerated corn bread batter shown in Hans, U.S. Pat. No. 3,620,763. Therein, a prepared corn bread batter was packed in fiber cans designed for distribution through refrigerated trade channels. The batter could then be used in making corn bread or corn bread muffins without the mixing step.

Typical convenience improvements in corn bread have related to the preparation of the corn bread batters and the storage of those batters in some form of dispensing pack. The batter can then be readily used in the same manner as "scratch" corn bread batter. However, portions are not premeasured and, if individual servings are desired, muffin tins must be used.

Corn bread has traditionally been made from a batter because of the difficulty of forming a dough from corn bread ingredients. There is not enough flour (gluten protein) in corn bread dough to form a cohesive, resilient body of dough and, if sufficient flour is added, the crumbly corn bread texture is lost. Corn bread dough, therefore, presents difficult processing problems especially for high-speed, commercial dough processing lines such as used in the refrigerated dough industry.

Occasionally attempts have been made to manufacture a biscuit containing cornmeal as a corn bread substituted. These biscuits have a corn meal taste but have the texture and appearance of biscuits because of the flour added to facilitate processing. Biscuits wherein cornmeal can be substituted for a portion of the flour are described very generally in U.S. Pat. No. 3,524,401.

SUMMARY OF THE INVENTION

The primary objects of this invention are to provide a corn bread dough, as opposed to a batter, for distribution in refrigerated trade channels and a process for commercially manufacturing such dough. Desirably, the corn bread dough sheet is formed by a special extrusion technique and cut into readily separable, individual, biscuit-like dough pieces. These dough pieces are subsequently packed in refrigerated dough containers. The dough must have a shelf life of at least 45 days. On opening the dough containers, the pieces must be readily separable without sticking or tearing. The individual pieces can be baked in an ordinary cake pan and have a texture and taste quite similar to homemade corn bread.

The biscuit-like dough pieces are comprised of a top and bottom layer of a first dough and an inner layer of a second dough. These dough pieces are formed by extruding a third bottom layer of the first dough onto a moving belt. The second dough is extruded, as an inner layer, directly on the bottom layer and, finally, a thin top layer of the first dough is extruded on the inner layer. The layers are generally bonded together with a compression roll.

The first dough is comprised of flour, shortening and water and is designed to maintain the integrity of the dough sheet during processing and to facilitate separation of the dough pieces after storage. This first dough must be substantially undeveloped to be processable as described above. The second dough is comprised of from 26 to 35 parts of wheat flour; from 16 to 26 parts cornmeal; from 6 to 23 parts shortening; from 2 to 11 parts sugar; sufficient water to provide a dough and sufficient chemical leavening to provide a positive pressure in the refrigerated dough container. This second dough is usually undevelopable. The first dough, the top and bottom layers, comprises from 10% to 30% by weight of the dough piece while the second dough comprises from 70% to 90% by weight of the dough piece.

BRIEF DESCRIPTION OF THE DRAWINGS

FIG. 1 is a perspective view of the processing line for making a corn bread dough sheet.

FIG. 2 is a schematic side view of the extruders used to form the top and bottom layers of the corn bread dough sheet.

FIG. 3 is a perspective view of one of the biscuit-like corn bread dough pieces of this invertion.

DESCRIPTION OF THE PREFERRED EMBODIMENTS

This invention relates to a corn bread dough divided into biscuit-like dough pieces, packed in refrigerated dough containers and stored under refrigerated conditions. The dough is stable under refrigerated conditions for at least 45 days and, when baked, has a texture and taste closely resembling that of homemade corn bread. This invention also relates to a process for manufacturing this corn bread dough.

The corn bread dough contains three distinct layers as shown in FIG. 3. The dough forming the top and bottom layers is comprised of shortening, flour and water. The physical properties of this dough in terms of its Brabender Farinograph (hereinafter referred to as "Farinograph") characteristics are critical to the proper functioning of the process and the final texture of the product. The dough must have a minimum Farinograph value of from 200 to 550 Brabender Units (hereinafter referred to as "BU") and a time-to-peak development as measured by the Farinograph of at least 15 minutes. These Farinograph characteristics represent what is usually considered to be a substantially undeveloped dough. The maximum Farinograph value should generally range from 400 to 850 BU.

The dough forming the inner layer is undevelopable and is comprised in parts by weight of the following critical components: from 26 to 35 parts wheat flour; from 16 to 26 parts cornmeal; from 6 to 23 parts shortening; from 2 to 11 parts sugar; water in an amount sufficient to provide a dough; and, chemical leavening in an amount sufficient to provide a positive pressure in a refrigerated dough container. The combined weight of the top and bottom layers comprises from 10% to 30% by weight of the dough piece and the inner layer comprises from 70% to 90% of the dough piece.

In addition to storage stability of the corn bread dough product and the baked product attributes, both doughs (outer layers and inner layer) must be extrudable to be processed. The outer layers must be extrudable in a smooth sheet in thickness ranging from one-sixteenth inch to one-fourth inch. They must also be sufficiently extensible to hold the inner, undevelopable layer in place and maintain the integrity of the dough piece. The inner layer must be extrudable for satisfactory processing of this dough, but it must also be sufficiently viscous so that it will not flow during forming of the biscuit-like dough pieces or during baking.

It should be understood that the characteristics of this corn bread dough and the baked corn bread are not attributable to any one component. Instead, the dough and product characteristics are the result of interactions among all of the required components and are further influenced by the processing conditions hereinafter set forth.

The Top and Bottom Layers

The top and bottom layers of this corn bread dough are comprised of flour, shortening and water. Preferably this first dough forming these layers contains from 43 parts to 53 parts by weight, preferably 46 parts to 49 parts, flour. The flour is comprised of starch and protein from the same or different sources. Preferably, the flour used herein does not contain more than 10% protein. Therefore, soft wheat flours, low-protein hard wheat flours and air classified flours are preferred for use herein.

The total shortening content of this first dough should range from 12 parts to 21 parts, preferably 16 parts to 20 parts, by weight. The shortenings used herein should be sufficiently melted in the temperature range between 100°F. and 120°F. to prevent a waxy mouthfeel in the baked corn bread product. Although it is preferred that the solids content of the shortening approach 0% in this temperature range, shortenings having minor solids contents of temperatures above 120°F. can be used. These shortenings are usually blends containing several different shortenings each having a separate melting point. Highly preferred shortenings for use herein are hydrogenated soy and cottonseed oils.

If less than 12 parts shortening are used herein, the outer layers become tough and chewy and contrast sharply with the crumbly inner layer. If more than 21 parts shortening are used herein, the dough becomes extremely difficult to work and process and becomes so fragile that it is incapable of containing the inner layer and maintaining the integrity of the dough piece.

This first dough should contain sufficient water to provide a machinable dough, that is, a dough that can be extruded in a smooth sheet in thicknesses ranging from one-sixteenth inch to one-fourth inch as described hereinafter. The amount of water required will be affected by the initial moisture content of the flour, the absorption of the flour, and the presence or absence of minor components. However, in usual formulations using flour of normal moisture content, sufficient water is added to provide a flour-to-water ratio of from 1.4 to 2.0, preferably from 1.5 to 1.8. The amount of water, therefore, generally ranges from about 23 to 30 parts by weight. The ratio of flour to water, absent gums or other materials which tie up large quantities of water, importantly affects the maximum and minimum Farinograph readings of this dough.

Sufficient leavening is required in the final dough product to create pressure in the refrigerated dough container and maintain that pressure during storage. All of the leavening can be added to the second dough comprising the inner layer or it can be divided between the second dough and the first dough forming the top and bottom layers. Leavening agents are defined more specifically in conjunction with the second dough.

The outer layers can also contain other components. For example, additional protein, such as milk protein, egg albumin, cottonseed protein and soy protein, can be added to the formulation. Milk proteins generally improve the flavor of the product, improve the nutritional value of the product, and have a positive affect on shelf life. Illustrative milk solids suitable for use herein are sodium and calcium caseinate, lactalbumin, albumin, nonfat dry milk, buttermilk solids and whey solids. Nonfat dry milk and buttermilk solids are preferred for use herein and are generally used in amounts ranging from 0 parts to 5 parts by weight.

Salt is generally included in the product formulation in amounts from 0 to 2 parts by weight to improve flavor. Salt also increases the storage stability of the product by reducing the available water. Additional components in minor amounts can include flavor and color agents, nutrient supplements, preservatives, antioxidants and reducing agents.

Potassium sorbate can also be added to the formula as a dough conditioner. The potassium sorbate apparently decreases mixing time and apparently increases the storage stability of the dough product (see U.S. Pat. No. 3,556,798).

These components are minimally mixed to provide a dough having minimum Farinograph value of from 200 to 550 BU and a time-to-peak development of between 15 to 50 minutes as measured by the Farinograph. It is preferred that the minimum Farinograph value of the dough obtained from the mixer be between 290 and 400 BU and the time-to-peak development range from 20 to 30 minutes. It is also preferred that the maximum Farinograph value be between 400 BU and 850 BU, more preferably from 500 BU to 650 BU. Doughs having these characteristics will support their own weight, are slightly extensible, and are extrudable in smooth sheets ranging in thickness from one-sixteenth inch to one-fourth inch. If the dough does not have a minimum Farinograph value of 200, it will be extremely wet and sticky and will not support its own weight which results in tearing of the dough sheet. At minimum Farinograph values of over 550 BU, the extruded sheet is irregular and may contain air pockets. This dough is unsatisfactory for extruding on commercial dough lines.

The time-to-peak development is also critical herein. Developed doughs, i.e., those doughs that have been worked sufficiently to form a substantial portion of the gluten structure that is formable, usually have a time-to-peak development as measured by the Farinograph of less than 10 minutes. For use herein, the gluten in this first dough should not be substantially developed into a matrix. The substantially undeveloped doughs suitable for use herein are characterized by peak times of over 15 minutes and minimum Farinograph values as set forth hereinbefore.

In order to conduct Farinograph tests, a Farinograph is equipped with a Sigma blade and a mixing bowl and adjusted to 60°F. A dough sample is obtained from the mixer and allowed to relax 5 minutes at room temperature. A 480-gram sample of dough is placed in the Farinograph bowl and the Farinograph is started. The Farinograph constantly mixes the dough placed therein. Dough consistency or viscosity in Brabender Units (meter-gram) is measured on the ordinate and time in minutes to peak development is measured on the abscissa. A minimum consistency or minimum Farinograph value is first obtained, and after full development of the dough, a maximum consistency or maximum Farinograph value is obtained. The Farinograph values are influenced by total gluten protein content of the dough, the farinaceous material/water ratio and the work expended during mixing, and to a lesser extent, the amount and type of shortening in the dough. For a general discussion of Farinographs, their operation and uses, see *The Farinograph Handbook*, Locken, et al. (Ed.), published by American Association of Cereal Chemises, Inc. (1972).

The minimum Farinograph values for undeveloped doughs do not occur until after the Farinograph has been started and has been running for at least several seconds. This may be due to incomplete mixing of the dough prior to introduction to the Farinograph or the thixotropic nature of the dough or both. In any event, the minimum Farinograph value is the lowest point on the Farinograph curve and does not necessarily occur at zero time.

The Inner Layer

The second dough comprising the inner layer of this dough piece contains from 26 to 35 parts by weight of flour, preferably from 28 to 33 parts by weight. The flour is preferably derived from wheat. Small amounts of other flours such as rye or potato flours may be used herein.

When the sugar content of the inner layer is between 2% and 6%, flour having a protein content of less than 12% is preferably used herein. Therefore, soft wheat flour, hard wheat flours with protein contents below 12% and air classified flours are preferred. If hard wheat flour having a protein content of over 14% or additional protein is used in these low-sugar formulations, the baked product may be tough or bready. When high-sugar formulations are used, i.e., 6%, to 11%, hard wheat flours having a protein content of over about 12% are preferred. The hard wheat flour controls the spread of the inner layer. If soft wheat flour is used in a high-sugar formulation, the inner layer may flow from beneath the top layer. The top layer than may become noticeable.

The cornmeal comprises from 16 to 26 parts by weight of the inner layer. A characteristic sieve analysis for the cornmeal used herein is as follows:

| | |
|---|---|
| On USBS Sieve No. 25 | 5.0% max. |
| On USBS Sieve No. 60 | 95% ± 5% |
| Thru USBS Sieve No. 100 | 2.0% max. |

The cornmeal is primarily responsible for giving this corn bread the corn flavor and corn bread texture.

Shortening commprises from 6% to 23% of the inner layer. It is preferred that a combination of shortening chips and melted shortening be used herein. The melted shortening is responsible for making the corn bread tender and the shortening chips are responsible for an open-grained product. Textural changes can be made by varying the ratio of melted shortening to shortening chips but the preferred ratio of melted shortening to shortening chips ranges from 30:70 to 50:50.

The shortening chips should have thicknesses between about one thirty-second inch and one-sixteenth inch and may have diameters of one-half inch to several inches. During the mixing process, the larger chips will be broken into particles having a diameter of approximately one-half inch.

The shortening chips, like the shortening, should be sufficiently melted in the temperature range between 100°F. and 120°F. to prevent a waxy mouthfeel in the baked product. Again minor amounts of solid shortening above a temperature of 120°F. can be tolerated if the solid shortening does not introduce a waxy mouthfeel in the baked product.

These chips should have a solids content at 60°F. of 55% or more if mixing is carried out at normal mixing temperatures ranging from 55°F. to 72°F. to prevent "greasing" the chips on the flour and cornmeal and insure that the chips will be relatively intact in the dough. If the temperature of the mixing operation is decreased, the solids content of the chips at 60°F. can decrease accordingly. Conversely, if higher mixing temperatures are used, a higher solids content is required to prevent greasing of the flour and cornmeal unless, of course, the chips are refrigerated prior to mixing. Hydrogenated vegetable oils, such as soy and cottonseed, are preferred for use herein. However, other vegetable and animal fats meeting the above criteria can be used herein.

The inner layer contains from 2 to 11 parts, prefereably 3 to 10 parts, by weight sugar. At sugar contents above 11%, the inner layer becomes more fluid and flows out from between the outer layers during baking. The baked product is also extremely crumbly. During storage, high-sugar formulations may also lose leavening gas.

While sucrose and dextrose are the preferred sugars, other sugars such as fructose and maltose can be substituted therefor. It is preferred that dextrose be used in low-sugar formulations to achieve blandness and product stability and sucrose be used in high-sugar formulations for its well-known flavor effects.

The inner layer should contain sufficient water to provide a dough that is extrudable but does not readily flow. The amount of water, of course, is affected by the initial moisture content and by the absorption of flour and cornmeal and the absence of minor components. For example, additional water would be required if gums were added to the inner layer formulation. Generally, water is added to this inner layer in amounts ranging from 18 to 29 parts by weight, preferably from 20 to 27 parts by weight.

Obviously, milk, buttermilk or other similar aqueous solutions can be utilized in place of the water above specified.

In addition to the above components, sufficient chemical leavening should be used in this product to provide a positive gas pressure in the sealed refrigerated dough container for at least 45 days. This pressure should be at least 10 psig and preferably ranges between 15 psig and 30 psig. In addition, enough dissolved carbon dioxide and gaseous carbon dioxide must remain in the dough to function as a leavening agent during baking. Edible chemical leavening compositions suitable for use herein include those conventionally employed in chemically leavened baking mixes. These leavening compositions normally consist essentially of a leavening base and a leavening acid. Conventionally, an alkaline bicarbonate of baking grade such as sodium bicarbonate and potassium bicarbonate and one or more of the edible leavening acids are used for this purpose. Illustrative acids suitable for use in these biscuits include glucono delta lactone, sodium acid pyrophosphate, sodium aluminum phosphate hydrate, sodium aluminum phosphate anhydride and hydrous monocalcium phosphate, monocalcium phosphate monohydrate, monosodium phosphate, alpha-glucoheptono-gamma-lactone, mixtures thereof and the like. Several of these acids can be controlled during manufacture to provide relatively slow or relatively fast reaction rates.

The chemical leavening should have a relatively slow rate of reaction at normal processing temperatures to prevent large volume increases in the dough on the processing line. The leavening base is generally sodium bicarbonate and comprises from about 0.9 to 1.3 parts by weight of the total formulation. Sufficient leavening acid is utilized to neutralize the base.

Preferred for use herein is a mixture of about 60% sodium acid pyrophosphate and 40% sodium aluminum phosphate (slow acting) as leavening acids and sodium bicarbonate as a leavening base. Generally, this leavening system comprises about 2.5 parts of the total biscuit dough.

When this second dough is properly formulated and maintained at about 60° F., the work required to extrude it through a ⅜ inch hole at the rate of 5 inches per minute, using a variable load cell of from 0 to 1,000 pounds to measure the work expended to maintain the constant rate, ranges from 200 inch-pounds to 850 inch-pounds, preferably from 200 inch-pounds to 600 inch-pounds. The apparatus used to take these measurements is an Instron equipped with a shear cell adapter assembly.

This dough is considered to be undevelopable. The term "undevelopable" as used herein refers to the gluten structure of the inner layer. When the dough forming the inner layer is subjected to mixing in a Farinograph mixing bowl, there is little or no difference between the minimum Farinograph reading and the maximum Farinograph reading. The reading on some doughs may increase or decrease as much as 150 BU on the Farinograph scale, however, we do not consider these doughs to be developable. The increase or decrease takes place over a long period of time (15 min.) and is nearly a linear function. Any gluten structure which develops is either broken down by the abrasive particulates or counteracted by the greasing out of the fat chips. Although the exact nature of this reaction is not known, the above represents our best theory at the present time.

Processing

The product of this invention is preferably manufactured by a novel process wherein each layer of the corn bread product is separately extruded in approximately the proper thickness for that layer and the layers are subsequently bonded together. Three separate extruders are required for this process. The first extruder extrudes the bottom layer of dough onto a moving conveyor in a continuous sheet. The next extruder extrudes the inner layer of dough directly onto the bottom layer and the third extruder extrudes the top layer onto the inner layer. These layers are then bonded together into a single dough sheet and the product can be cut and packed in the conventional manner. The extrusion speeds and the speed of the belt must be synchronized in order to prevent tearing or bunching of the dough sheet.

Referring now to FIG. 1, a belt conveyor 11 is provided which is positioned directly below the first extruder 12, second extruder 13 and third extruder 14. Also positioned above the belt 11 are two applicators 16 and 17, a de-dusting means 18 and a compression roll 19.

In the preferred method of practicing this invention, a separating agent 21 such as cornmeal or corn flour is loaded into applicators 16 and 17. A first dough 22 is placed in the first and third extruders 12 and 14 and a second dough 23 is placed in the second extruder 13. The separating agent 21 is applied directly to the belt conveyor 11 by applicator roll 24 to provide a thin covering of cornmeal on the belt conveyor 11. The first dough 22 in the hopper 26 of the first extruder 12 is delivered to a knurled feed roll 27 and a smooth feed roll 28 by agitator 29. As the first dough 22 passes through the feed rolls 27 and 28, the thickness of the dough sheet is reduced to approximately one-half inch. It is further reduced when placed between the smooth feed roll 28 and the infeed roll 31 to between one-sixteenth inch and one-fourth inch. Transfer blades 32 and 33 are positioned below the smooth feed roll 28 and the infeed roll 31 to properly position the dough sheet 34 on the belt conveyor 11.

Referring specifically to FIG. 2, the knurled feed roll 27 and the infeed roll 31 are held in fixed positions by bracket 35 and the smooth feed roll 28 and the knurled feed roll 27 are held in fixed positions by bracket 36. The final thickness of the dough sheet 34 can be controlled by regulating the distance between the smooth feed roll 28 and the infeed roll 31. As shown in FIG. 2, the smooth feed roll 28 is pivotable about the axis of the knurled feed roll 27.

REferring again to FIG. 1, the second dough 23 is contained in a hopper 37 in said second extruder 13. This dough 23 is gravity fed through knurled extruding rolls 38 and 39. The extruding rolls 38 and 39 can be adjusted to provide the proper thickness of this inner layer 40, preferably between one-half inch and 2 inches. In the practice of this invention, this second dough 23 is quite sticky and may adhere to the knurled extruding rolls 38 and 39 unless a separating agent such as dusting flour is applied to the rolls 38 and 39.

It is helpful in the practice of this invention to remove excess dusting flour by means of a de-dusting means 18. When flour is used, a simple brush can be used as shown in FIG. 1. Other means, of couse, are available for removing flour and include pneumatic or vacuum removal or combinations thereof.

The third extruder 14 is substantially the same configuration as the first extruder 12. Its purpose is to extrude a thin top layer 41, i.e., from one-sixteenth inch to one-fourth inch, of the first dough 22 onto said inner layer 40. The top layer 41 is approximately the same thickness as the bottom layer 34. Preferably the top and bottom layers 34 and 41 should comprise from 10% to 30% by weight of the dough sheet while the inner layer 40 comprises from 70% to 90% by weight of the dough sheet.

After the dough sheet is formed, separating agents such as cornmeal or corn flour are applied from applicator 17 by applicator roll 42 onto the top surface of the dough sheet. These separating agents are essential to keep the dough pieces from sticking together. The final step in this process is the application of compressive forces through use of a compression roll 19. The compression roll 19 or a series of such rolls bond the dough layers together to form a continuous dough sheet which can be cut and packed in a manner similar to conventional refrigerated dough methods.

The process described above has several advantages over conventional refrigerated dough processing lines. Nearly all refrigerated doughs are highly developed and, therefore, cannot be extruded in thin, smooth sheets as described above. Instead, these developed doughs must be extruded in very thick sheets, e.g., over 4 inches, and then sheeted down or reduced to the proper thickness of about five-eighths inch. The reducing process requires large amounts of capital for reducing rolls, added energy, and additional floor space when compared with this process.

Product Characteristics

The corn bread dough of this invention when packed in refrigerated dough containers must be storage stable under refrigerated storage conditions (32° F. to 50° F., preferably 32° F. to 40° F.) for at least 45 days and preferably at least 60 days. To maintain storage stability for this period of time, a positive internal pressure of at least 10 psig and preferably from 15 to 30 psig must initially exist in the dough container. As a test for stability, the corn bread dough, when baked under optimum conditions, should exhibit the attributes below so that this cornbread will closely resemble homemade corn bread. Optimum baking conditions for the formulations claimed herein generally require an oven temperature of about 450° F. and a baking time of from 10 to 14 minutes. It is, of course, understood that the temperature and baking time may vary due to changes in amounts of minor components, changes in altitudes, and individual tastes.

In order to meet the requirements of being storage stable for 45 days, the corn bread dough, when baked after storage for this time period, must produce a corn bread having a texture and flavor closely resembling those attributes of homemade corn bread. Physical appearance should be similar to corn bread although it is recognized that this corn bread product is baked in individual pieces and has a different surface treatment while traditional corn bread is baked in a large pan.

In order to achieve this goal, the corn bread dough must be readily separated into the individual dough pieces. Separation is graded herein on a scale of 1 to 10 with a score of 10 indicating that the individual dough pieces are readily separable and a score of 1 indicating that the dough pieces adhere together and cannot be separated. On this scale, scores of 7 to 10 are acceptable.

Another test for separability is surface tearing. Surface tearing occurs when portions of adjacent dough pieces adhere to each other. As the dough pieces are separated, a portion of the outer layer of one dough piece will be removed with the adjacent dough piece. In grading surface tearing, a scale of 0 to 4 was used. A score of 0 indicates no surface tearing and a score of 4 indicates that the entire surface of the adjacent dough piece is torn. Scores of 0, 1 and 2 are acceptable.

The general appearance of the baked product was graded on a scale of 1 to 10. General appearance refers only to the appearance of the baked corn bread product before it is broken. General appearance scores reflect crust color, visibility of the top layer, spread of the inner layer and the surface appearance. Scores of 7 to 10 are acceptable.

Crumbliness is one of the most important textural measurements of corn bread. Crumbliness measurements were based on a scale of 0 to 4 with 0 representing a bread-like texture and 4 representing such a degree of crumbliness that the product was difficult to handle and difficult to eat. Scores of 0.25 to 2 represent acceptable crumbliness in this product and typical crumbliness in homemade corn bread.

Overall texture was rated on a scale of 1 to 10, scores of 7 to 10 being acceptable. The overall texture measurement is based subjectively on crumbliness, tenderness and grain size. Grain size is more specifically rated on a scale of 1 to 5. A score of 1 represents very fine grain similar to pound cake and 5 represents a very open grain similar to yeast leavened sweet rolls. Scores of 2 and 3 are acceptable for corn bread.

Spread is also measured to determine the flow of the inner layer during baking. In order to obtain acceptable corn bread, the inner layer must flow to a limited degree to eliminate, on one hand, a biscuit-like appearance and, on the other hand, the appearance of pancakes. The numbers represented in the average spread column represent the width of six baked dough pieces, the dough pieces initially having a diameter of 2 inches and a depth of five-eighths inch. Using this test, spreads of between 34 and 36 cms. are acceptable.

The specific volume of the baked biscuit is also important and represents the volume in cubic centimeters occupied by 1 gram of product. The specific volume may be determined as follows: The baked product is removed from the pan after baking, cooled for 1 hour and weighed. Several weighed biscuits are placed in a special layer cake pan and rape seeds are poured over the product. The rape seeds are then leveled with the top of the pan and the pan, product and seeds are weighed. Knowing these two weights, the specific volume can then be read from an appropriate nomograph. Specific volume can also be determined by other conventional methods.

The specific volume is an indicator of the relative lightness and fluffiness of the baked product. Corn bread having a specific volume of less than 2.0 cubic centimeters per gram has been found to be unacceptable in comparison to a homemade corn bread. Therefore, the specific volume of the corn bread of this invention must be greater than 2.0 cc/gm.

Another measure of spread of the inner layer is the coverage of the inner layer by the outer layer. The outer layer of dough does not flow as readily as the inner layer. It is desirable that the outer layer cover a substantial amount of the inner layer and not be readily apparent on the surface. Outer layer coverage (OLC) is graded on a scale of 0 to 4. A score of 0 represents no flow of the inner layer from under the outer layer while a score of 4 represents extreme flow of the inner layer wherein the exposed upper surface of the inner layer is equal to or greater than the area covered by the outer layer. Acceptable scores range from 0 to 2.

The following examples are illustrative of the invention:

EXAMPLE I

The following runs are illustrative of two commercial type products prepaed in the laboratory—a bland corn bread and a sweet corn bread. Ten thousand gram samples of the inner layer (both bland and sweet) and ten thousand gram samples of the outer layers were prepared according to the following formulations:

| INGREDIENTS | INNER LAYER | | OUTER LAYERS | |
|---|---|---|---|---|
| | Bland % Formula | Sweet % Formula | Bland % Formula | Sweet % Formula |
| SAPP | 0.750 | 0.750 | 0.600 | 0.600 |
| SALP | 0.550 | 0.550 | 0.818 | 0.818 |
| Soda | 1.100 | 1.100 | 1.200 | 1.200 |
| Salt | 1.500 | 1.500 | 1.200 | 1.200 |
| Sucrose | | 10.000 | 3.000 | 3.000 |
| Dextrose | 4.000 | | | |
| Buttermilk solids | 2.250 | 2.250 | | |
| Nonfat dry milk | | | 3.000 | 3.000 |
| Flour No. 1 | 29.200 | | | |
| Flour No. 2 | | 29.000 | 45.866 | 46.066 |
| Plastic shortening | 7.500 | 7.500 | 18.000 | 18.000 |
| Shortening chips | 6.000 | 6.000 | | |
| Water | 25.550 | 21.350 | 26.066 | 25.866 |
| Cornmeal | 21.600 | 20.000 | | |
| Potassium sorbate | | | 0.100 | 0.100 |
| Coloring | | | 0.150 | 0.150 |

The farinaceous materials used in these runs had a moisture content of about 14%. Flour No. 1 was soft wheat flour having a protein content of about 9.2%. Flour No. 2 was a hard wheat flour milled from 100% hard spring wheat and the protein content was about 14%. The shortening chips used herein were 100% hydrogenated soy oil having a Wiley melting point of 111° F. ± 2° F. The solids fat index was as follows:

| TEMPERATURE | % SOLIDS |
|---|---|
| 50° F. | 65 ± 3 |
| 70° F. | 57 ± 3 |
| 80° F. | 53 ± 3 |
| 92° F. | 36 ± 3 |
| 104° F. | 13 maximum |

The plastic shortening which was melted prior to use herein was an emulsified, hydrogenated soy oil having a Wiley melting point of 106° F. ± 3° F. The solids fat index was as follows:

| TEMPERATURE | % OLIDS |
|---|---|
| 50° F. | 39 ± 3 |
| 70° F. | 26 ± 3 |
| 80° F. | 20 ± 3 |
| 92° F. | 11 ± 2.5 |
| 100° F. | 5 ± 2.0 |
| 110° F. | 0 ± 1.5 |

The cornmeal used herein had a moisture content of 14% and a bright yellow color. Granulation was as follows:

| On USBS Sieve No. 25 | 5.0% max. |
|---|---|
| On USBS Sieve No. 60 | 95% ± 5% |
| Thru USBS Sieve No. 100 | 2.0% max. |

The leavening system used herein comprised sodium acid pyrophosphate (SAPP), sodium sluminum phosphate (SALP) and powdered bicarbonate of soda. The rate of reaction of SALP and SAPP with a leavening base can be controlled by the manufacturer's processing methods. Both the SALP and SAPP used herein are relatively slow reacting.

The inner layer of dough was prepared by mixing and blending the SAPP, SALP, soda, salt, buttermilk solids and sugar and adding this blend to the flour. The water (about two-thirds water and one-third ice) was added to the mixing bowl of a Hobart 600 mixer. The plastic shortening was melted and sprayed into the water with agitation. The dry ingredients other than shortening chips and cornmeal were added to the water-shortening mixture and mixed for one-half minute at 72 rpm and 6 minutes at 127 rpm. The shortening chips and cornmeal were added and the mixture was mixed for 30 seconds at 72 rpm and 45 seconds at 127 rpm. The sides of the bowl were scraped down and the mixture was mixed for an additional 45 seconds at 127 rpm.

This inner layer dough was characterized by Farinograph minimum value of 240 BU and after 26 minutes a value of about 335 BU. The Farinograph line was essentially linear.

The outer layer doughs were prepared by mixing and blending the potassium sorbate, SALP, SAPP, soda, sugar and salt. The water (about two-thirds water and one-third ice) was added to the mixing bowl of a Hobart 600 mixer and yellow coloring was added thereto. The plastic shortening was melted and added to the water with vigorous agitation. The flour and nonfat dry milk was added to the water and mixed for one-half minute at 72 rpm and 3 minutes at 127 rpm. The resulting dough was cut into chunks and the blend of minor ingredients was added thereto and mixed for one-half minute at 72 rpm and 3 minutes at 127 rpm.

The outer layer dough used with the bland product, after mixing, was characterized by a Farinograph minimum value of 355 BU, a time-to-peak development of 28 minutes and a Farinograph maximum value of 630 BU. The outer layer dough used with the sweet product was characterized by a Farinograph minimum value of 370 BU, a time-to-peak development of 28.2 minutes and a Farinograph maximum value of 605 BU.

The inner layer and outer layers were weighed out in a weight ratio of 80:20. The outer layers were sheeted to a depth of 3¼ mm. The inner dough layer was placed on top of one-half of the sheeted outer layer and the other half of the outer layer was folded thereover. The laminated corn bread dough was sheeted to between 16 and 17 mm in depth. The corn bread dough was cut into hexagonal pieces about 2 inches in diameter and weighing about 250 grams. The outer layers were sprayed with separating oil and dusted with a 50:50 corn flour-cornmeal mixture.

The dough pieces were subsequently packed in refrigerated dough containers, proofed at 90° F. for 40 to 80 minutes until a can pressure of about 15 psig was attained. The finished corn bread dough was stored at 40° F. Product was baked from this dough at intervals as shown in the following table. Product attributes are summarized in the following table.

Example I. That dough was used in the same ratio to the inner dough as set forth in Example I.

The formulations of Table 2 are sweet formulations. In addition to the percentages set forth in the table, each formulation contains 10% sucrose, 0.75% sodium acid pyrophosphate, 0.55% sodium aluminum phosphate, 1.1% sodium bicarbonate, 1.5% salt and 2.25% buttermilk solids. The formulations of Table 2 are bland formulations wherein 4% dextrose is substituted for 10% sucrose. The shortening used was a combination of shortening chips and plastic shortening in a weight ratio of 45:55.

TABLE 1

| Product Attributes (Storage Time) | Initial | | 15 Days | | Bland 42 Days | | 60 Days | |
|---|---|---|---|---|---|---|---|---|
| Pressure (psig) | 32 | 29 | 35 | 29 | 16 | 21 | 6 | 21 |
| Surface Tearing | 0 | 0 | .5 | .5 | 1 | 2 | 2.0 | 1.0 |
| Separation | 8 | 8 | 9 | 9 | 8 | 7 | 7 | 8 |
| General Appearance | 7 | 7 | 6 | 6 | 8 | 8 | 6 | 6 |
| Crumbliness | 2.0 | 2.0 | 2.0 | 2.0 | 3.0 | 3.0 | 4.0 | 4.0 |
| Grain Size | 3 | 3 | 3 | 3 | 3 | 3 | 3 | 3 |
| Texture | 7 | 7 | 7 | 7 | 7 | 7 | 5 | 5 |
| Average Spread (cm.) | 34.9 | 34.6 | 34.5 | 34.4 | 34.1 | 34.4 | 34.2 | 34.5 |
| Flavor | 8 | 8 | 7 | 7 | 8 | 8 | 8 | 8 |

| Product Attributes (Storage Time) | Initial | | 3 Weeks | | Sweet 6 Weeks | | 9 Weeks | |
|---|---|---|---|---|---|---|---|---|
| Pressure (psig) | 20 | 24 | 28 | 29 | 26 | 24 | 19 | 26 |
| Surface Tearing | 0 | 1 | .5 | .5 | 1 | 1 | 3 | 1 |
| Separation | 10 | 9 | 8 | 8 | 8 | 8 | 6 | 8 |
| General Appearance | 8 | 8 | 7 | 8 | 8 | 8 | 7 | 7 |
| Crumbliness | 2 | 2 | 2 | 2 | 1 | 1 | .25 | .25 |
| Grain Size | 3 | 3 | 2 | 2 | 2 | 2 | 2 | 2 |
| Texture | 7 | 7 | 8 | 8 | 8 | 8 | 6 | 6 |
| Average Spread (cm.) | 35.7 | 35.9 | * | * | 34.0 | 34.6 | 34.2 | 33.5 |
| Flavor | 8 | 8 | 8 | 8 | 8 | 8 | 8 | 8 |

* Discarded by mistake

From studying Table 1, it is apparent that the bland product meets the criteria set forth above initially and after 2 weeks. The bland product is also acceptable at 42 days but is unacceptable at 60 days due to excessive crumbliness, poor texture, and loss of can pressure in one sample. The sweet baked product is acceptable initially, and at 3 weeks and 6 weeks. After 9 weeks storage, the dough pieces become more difficult to separate and the texture degrades. The product is marginally acceptable at 63 days.

EXAMPLE II

The runs set forth in Tables 2 and 3 are illustrative of a series of tested formulations. In each run, the outer layers had the same composition as the outer layers in The flour used herein was a hard wheat flour milled from 100% hard spring wheat having a protein content of about 14%. The other components were identical to those used in Example I.

Ten thousand gram batches of the inner layer of dough in each run were made and the product was formed as described in Example I. The dough was cut and packed in refrigerated dough containers, proofed at 90° F. for 40 to 80 minutes and stored at 40° F. overnight. A container from each batch was opened the next day with the results shown in Tables 2 and 3. After 63 days, a container from each batch was again opened and the results recorded.

OLC in Tables 2 and 3 refers to the test for outer layer coverage as hereinbefore defined.

TABLE 2

| Run No. | Water % | Shortening % | Cornmeal % | Flour % | Crumbliness | | Specific Volume | | Spread | | OLC | |
|---|---|---|---|---|---|---|---|---|---|---|---|---|
| | | | | | Initial | 63 Days | Initial | 63 Days | Initial | 63 Days | Initial | 63 Days |
| 1 | 17.60 | 22.65 | 17.60 | 26.00 | .25 | 1.0 | 2.27 | 2.13 | 36.2 | 35.9 | 2 | 3 |
| 2 | 24.32 | 5.87 | 21.80 | 31.86 | 1 | 2.0 | 2.33 | 2.07 | 35.7 | 36.5 | 2 | 2 |
| 3 | 24.32 | 7.53 | 26.00 | 26.00 | 1 | 4.0 | 2.16 | 2.03 | 36.3 | 37.3 | 2 | 4 |
| 4 | 17.60 | 8.39 | 26.00 | 31.86 | .5 | 0 | 2.34 | 2.18 | 33.6 | 33.0 | 1 | 1 |
| 5 | 24.32 | 17.61 | 15.93 | 26.00 | 4 | 4.0 | 2.51 | 2.41 | 38.7 | 38.8 | 3 | 4 |
| 6 | 17.61 | 18.45 | 15.93 | 31.87 | 1 | .5 | 2.42 | 2.23 | 35.1 | 34.6 | 1 | 1 |
| 7 | 17.60 | 14.25 | 26.00 | 26.00 | 1 | 1.0 | 2.06 | 2.06 | 34.4 | 33.9 | 1 | 1 |
| 8 | 24.32 | 11.74 | 15.93 | 31.86 | 1 | 3.0 | 2.48 | 2.26 | 36.8 | 36.2 | 2 | 3 |
| 9 | 20.96 | 20.96 | 15.93 | 26.00 | 2 | 1.0 | 2.55 | 2.33 | 37.9 | 36.6 | 3 | 3 |
| 10 | 17.60 | 21.38 | 15.93 | 28.94 | 2 | 1.0 | 2.29 | 2.23 | 36 | 34.8 | 3 | 2 |
| 11 | 17.60 | 18.45 | 21.80 | 26.00 | 1 | 1.0 | 2.14 | 2.17 | 34.8 | 34.4 | 2 | 2 |
| 12 | 20.12 | 5.87 | 26.00 | 31.86 | .25 | .5 | 2.06 | 1.99 | 33.7 | 33.0 | 2 | 1 |
| 13 | 24.32 | 5.86 | 26.00 | 27.67 | 2 | 2.0 | 2.27 | 2.12 | 36.2 | 35.6 | 2 | 3 |
| 14 | 19.29 | 22.63 | 15.93 | 26.00 | 1 | 2.0 | 2.32 | 2.18 | 37.3 | 35.9 | 3 | 3 |
| 15 | 22.64 | 19.28 | 15.93 | 26.00 | 4 | 4.0 | | 2.26 | | 37.2 | 3 | 4 |
| 16 | 20.96 | 14.26 | 20.96 | 27.67 | 2 | 2.0 | 2.24 | 2.20 | 36.4 | 36.2 | 2 | 3 |

TABLE 3

| Run No. | Water % | Shortening % | Cornmeal % | Flour % | Crumbliness Initial | Crumbliness 63 Days | Specific Volume Initial | Specific Volume 63 Days | Spread Initial | Spread 63 Days | OLC Initial | OLC 63 Days |
|---|---|---|---|---|---|---|---|---|---|---|---|---|
| 1 | 27.85 | 19.77 | 16.17 | 26.06 | .5 | 2.0 | 1.98 | 1.96 | 34.6 | 34.3 | 1 | 3 |
| 2 | 21.56 | 8.99 | 26.06 | 33.24 | .0 | 0.0 | 1.84 | 1.77 | 31.5 | 31.9 | 0 | 0 |
| 3 | 21.56 | 16.40 | 25.61 | 26.28 | .25 | 2.0 | 2.1 | 2.04 | 33.4 | 33.6 | 1 | 1 |
| 4 | 27.85 | 12.59 | 16.17 | 33.24 | .25 | 2.0 | 2.5 | 2.34 | 35.3 | 36.0 | 2 | 2 |
| 5 | 21.56 | 22.24 | 16.17 | 29.88 | .25 | 1.0 | 2.27 | 2.34 | 34.1 | 33.4 | 1 | 1 |
| 6 | 27.85 | 6.29 | 26.06 | 29.65 | .0 | 3.0 | 2.01 | 1.97 | 34.4 | 34.2 | 2 | |
| 7 | 21.56 | 20.45 | 21.56 | 26.28 | .25 | 1.0 | 2.19 | 1.98 | 34.6 | 34.4 | 0 | 2 |
| 8 | 21.56 | 19.32 | 16.17 | 32.80 | .25 | .25 | 2.29 | 2.28 | 32.8 | 33.2 | 0 | 1 |
| 9 | 27.85 | 9.88 | 26.06 | 26.06 (Can exploded) | — | 3.0 | — | 2.16 | — | 35.2 | — | 2 |
| 10 | 27.85 | 6.29 | 22.46 | 33.25 | 1.0 | 2.0 | 2.1 | 1.94 | 34.2 | 33.7 | 2 | 3 |
| 11 | 21.56 | 22.46 | 19.77 | 26.06 | 2.0 | 0.5 | 2.11 | 2.27 | 33.9 | 33.8 | 1 | 1 |
| 12 | 21.56 | 18.42 | 23.58 | 26.29 | .25 | 1 | 2.0 | 2.0 | 33.0 | 33.0 | 1 | |
| 13 | 21.56 | 20.67 | 16.17 | 31.45 | .25 | .25 | 2.30 | 2.30 | 32.5 | 33.4 | 0 | 1 |
| 14 | 24.93 | 22.46 | 16.17 | 26.29 | 1.0 | 1.0 | 2.19 | 2.24 | 35.0 | 35.3 | 2 | 3 |
| 15 | 24.26 | 6.29 | 26.06 | 33.24 | 0.0 | 2.0 | 1.93 | 2.03 | 31.6 | 32.9 | 0 | 1 |
| 16 | 24.71 | 14.38 | 21.11 | 29.65 | 2.0 | 2.0 | 2.22 | 2.18 | 34.0 | 34.1 | 2 | 1 |

The products of Table 2 were baked after one day of storage at 40° F. and again after 63 days of storage at 40° F. After one day storage, the baked products of Runs 4, 5 and 12 and 15 were unacceptable and the products of Runs 9, 10 and 14 were only marginally acceptable. Unacceptable Runs 5 and 15 used flour percentages below the preferred level herein and on the extreme outer limits of the claimed ranges. Both of these products were extremely crumbly and, therefore, unacceptable. Unacceptable Runs 4 and 12 used low shortening and high flour percentages. These products were biscuit-like and bready with very little spread. After 63 days storage, the products of Runs 3, 4, 5, 12 and 15 were unacceptable and Runs 8, 9 and 14 were marginal.

The products of Table 3 were baked after 1 day of storage at 40° F. Only the baked products of Runs 4, 5, 9, 10, 11, 14 and 16 were acceptable. Runs 2, 6 and 15 were totally unacceptable with the remainder of the runs being of a marginal nature. The marginal nature of this group or runs was apparently due to the use of hard wheat flour.

EXAMPLE III

The runs set forth in Tables 4 and 5 are illustrative of a series of tested formulations. In each run, the top and bottom layers had the same composition as the outer layers in Example I. That dough was used in the same ratio to the inner dough as set forth in Example I.

Flour number 1 and flour number 2 of Table 4 are identical, respectively, to flour number 1 and flour number 2 of Example I.

Shortening number 1 was a hydrogenated vegetable shortening containing monoand diglycerides and having a Wiley melting point of 115° ± 2° F. The solids fat index was as follows:

| TEMPERATURE | % SOLIDS |
|---|---|
| 50° F. | 26 |
| 70° F. | 20 |
| 92° F. | 14 |
| 104° F. | 10 |

Shortening number 2 was a hydrogenated vegetable shortening having a Wiley melting point of 102° F. The solids fat index was as follows:

| TEMPERATURE | % SOLIDS |
|---|---|
| 50° F. | 48 |
| 70° F. | 34 |
| 92° F. | 12 |
| 100° F. | 4 |
| 110° F. | 0 |

The shortening chips used were identical to those of Example I and the sugar was sucrose.

Table 5 details the dough and baked product attributes of the formulations of Table 4. With the exception of Run 11, all of the product was either unacceptable or marginal.

TABLE 4

| Run No. | Plastic % No. 1 | Shortening Plastic % No. 2 | Chips % | Flour % No. 2 | Flour % No. 1 | Water % | Sugar % | Salt % |
|---|---|---|---|---|---|---|---|---|
| 1 | 13.500 | — | — | — | 35.336 | 26.014 | — | 0.500 |
| 2 | — | 13.500 | — | — | 34.760 | 25.590 | — | 1.500 |
| 3 | 13.500 | — | — | 34.760 | — | 25.590 | — | 1.500 |
| 4 | — | 13.500 | — | 35.336 | — | 26.014 | — | 0.500 |

TABLE 4-continued

| Run No. | Plastic % No. 1 | Shortening Plastic % No. 2 | Chips % | Flour % No. 2 | Flour % No. 1 | Water % | Sugar % | Salt % |
|---|---|---|---|---|---|---|---|---|
| 5 | 1.350 | — | 12.150 | — | 34.760 | 25.590 | — | 1.500 |
| 6 | — | 1.350 | 12.150 | — | 35.336 | 26.014 | — | 0.500 |
| 7 | 1.350 | — | 12.150 | 35.336 | — | 26.014 | — | 0.500 |
| 8 | — | 1.350 | 12.150 | 34.760 | — | 25.590 | — | 1.500 |
| 9 | 13.500 | — | — | — | 28.424 | 20.926 | 11.000 | 1.500 |
| 10 | — | 13.500 | — | — | 29.000 | 21.350 | 11.000 | 0.500 |
| 11 | 13.500 | — | — | 29.000 | — | 21.350 | 11.000 | 0.500 |
| 12 | — | 13.500 | — | 28.424 | — | 20.926 | 11.000 | 1.500 |
| 13 | 1.350 | — | 12.150 | — | 29.000 | 21.350 | 11.000 | 0.500 |
| 14 | — | 1.350 | 12.150 | — | 28.424 | 20.926 | 11.000 | 1.500 |
| 15 | 1.350 | — | 12.150 | 28.424 | — | 20.926 | 11.000 | 1.500 |
| 16 | — | 1.350 | 12.150 | 29.000 | — | 21.350 | 11.000 | 0.500 |

TABLE 5

| Run No. | Can Pressure | Crumbliness | Specific Volume | Spread | OLC | Separability | Flavor | General Appearance | Texture |
|---|---|---|---|---|---|---|---|---|---|
| 1 | 9 | 0.5 | 2.17 | 31.8 | 1 | 6 | 5 | 5 | 5 |
| 2 | 8 | 2 | 1.95 | 31.7 | 4 | 7 | 7 | 6 | 6 |
| 3 | 28 | 0 | 2.34 | 32.2 | 0 | 7 | 5 | 5 | 6 |
| 4 | 23 | 0 | 2.36 | 33.0 | 0 | 5 | 7 | 5 | 7 |
| 5 | 9 | 1 | 1.87 | 31.9 | 1 | 7 | 5 | 5 | 6 |
| 6 | 14 | 0.25 | 1.94 | 32.2 | 1 | 7 | 6 | 6 | 5 |
| 7 | 25 | 0.50 | 2.33 | 33.3 | 0 | 9 | 6 | 5 | 5 |
| 8 | 29 | 0.25 | 2.22 | 32.3 | 0 | 6 | 6 | 5 | 6 |
| 9 | 27 | 4 | 2.29 | 38.4 | 4 | 7 | 8 | 6 | 7 |
| 10 | 27 | 2 | 2.33 | 37.3 | 3 | 5 | 7 | 4 | 6 |
| 11 | 28 | 1 | 2.64 | 36.5 | 2 | 7 | 8 | 7 | 8 |
| 12 | 27 | 2 | 2.46 | 36.0 | 3 | 8 | 7 | 6 | 7 |
| 13 | 33 | 1 | 2.10 | 36.7 | 4 | 6 | 8 | 5 | 6 |
| 14 | 30 | 0.5 | 2.03 | 37.3 | 4 | 6 | 8 | 5 | 5 |
| 15 | 31 | 2 | 2.29 | 36.8 | 3 | 8 | 7 | 6 | 7 |
| 16 | 32 | 2 | 2.28 | 37.3 | 2 | 6 | 7 | 6 | 6 |

EXAMPLE IV

The following run is illustrative of the preferred commercial process for use herein. The inner layer had the following formulation:

| INGREDIENTS | WEIGHT |
|---|---|
| SAPP | 5 lbs. 10 oz. |
| SALP | 4 lbs. 2 oz. |
| Soda | 8 lbs. 4 oz. |
| Salt | 11 lbs. 4 oz. |
| Buttermilk solids | 16 lbs. 14 oz. |
| Shortening | 59 lbs. |
| Shortening chips | 45 lbs. |
| Flour | 222 lbs. 12 oz. |
| Water | 187 lbs. 14 oz. |
| Cornmeal | 162 lbs. |
| Dextrose | 30 lbs. |
| Total | 752 lbs. 12 oz. |

All of the components were identical to those used in Example I. The flour used herein was flour number 1 of Example I.

All of the components with the exception of the shortening chips and cornmeal were mixed together in a sigma blade mixer for 210 seconds. The cornmeal and shortening were thereafter added and mixed for 135 seconds.

The top and bottom layers had the following composition:

| INGREDIENTS | WEIGHT |
|---|---|
| SAPP | 3 lbs. 4 oz. |
| SALP | 2 lbs. 7 oz. |
| Soda | 4 lbs. 13 oz. |
| Salt | 4 lbs. 13 oz. |
| Sugar | 12 lbs. |
| Nonfat dry milk | 12 lbs. |
| Water | 105 lbs. 8 oz. |
| Shortening | 72 lbs. |
| Flour | 184 lbs. 4 oz. |
| Potassium sorbate | 7 oz. |
| Artificial coloring | 9.5 oz. |
| Total | 402 lbs. 1.5 oz. |

Again, all of the components were identical to those in Example I. The water, shortening, flour and coloring were first mixed together in a Baker-Perkins straight bar mixer for one-half minute at 31½ rpm and for 1½ minutes at 63 rpm. Thereafter, the remainder of the ingredients were added thereto and mixed for one-half minute at the slow speed and 2½ minutes at the fast speed. This dough was substantially undeveloped.

The bottom layer was extruded onto a conveyor lightly dusted with cornmeal. The depth of this layer was slightly less than one-eighth inch. The inner layer was extruded over the bottom layer to a depth of slightly more than 1 inch and the top layer was then extruded thereover. The ratio of bottom layer to inner layer to top layer was about 1:8:1.

The top surface was dusted with corn flour and passed through a compression roll to bond the layers. Subsequently, the dough sheet was passed through a three-roll roll stand to control product depth and weight.

Thereafter the product was cut, sprayed with oil and packed in a conventional manner.

EXAMPLE V

A control first dough formulation was prepared containing the following ingredients:

| INGREDIENTS | PER CENT BY WEIGHT |
| --- | --- |
| SAPP | .818 |
| SALP | .600 |
| Sodium bicarbonate | 1.200 |
| Salt | 1.200 |
| Sugar | 3.000 |
| Nonfat dry milk | 3.000 |
| Potassium sorbate | 0.100 |
| Flour | 44.866 |
| Shortening | 18.000 |
| Water | 27.066 |
| Color | .150 |

The flour, shortening, water and color were mixed for one-half minute at 72 rpm and 3 minutes at 127 rpm in a Hobart 600 mixer. The remainder of the ingredients were then added and mixed for one-half minute at 72 rpm and 3 minutes at 127 rpm. This formulation (batch number 1) was considered as the control formulation in the following runs. The amount of flour and water was varied as shown in Table 1.

The mix time was held constant through this example with the exception of batch number 2(b) wherein the mix time was one-half minute at 72 rpm and 5 minutes at 127 rpm followed by one-half minute at 72 rpm and 3 minutes at 127 rpm. The Farinograph readings were taken using the dough after mixing but prior to extrusion.

The dough was extruded in a three-roll cream or jam spreader manufactured by Simon-Vicars Ltd. onto a moving belt in a thickness of about one-eighth inch.

It is readily apparent from Table 6 that doughs having acceptable Farinograph characteristics include batches 1, 2(a) and 4. This indicates that the Farinograph minimum values should range from about 200 to 550 BU, the time-to-peak development should be about 15 minutes or more and the Farinograph maximum values should range from 400 to 850 BU.

| INGREDIENTS | PER CENT BY WEIGHT |
| --- | --- |
| Water | 24.550 |
| Shortening | 7.500 |
| Buttermilk solids | 2.250 |
| Dextrose monohydrate | 4.000 |
| SAPP | .750 |
| SALP | .550 |
| Soda | 1.100 |
| Salt | 1.500 |
| Cornmeal | 21.600 |
| Shortening chips | 6.00 |

The dough was prepared by mixing all ingredients except the cornmeal and shortening chips in the first stage for one-half minute at 72 rpm and 3 minutes at 127 rpm in a Hobart 600 mixer. Subsequently the cornmeal and shortening chips were added and the formulation was again mixed for one-half minute at 72 rpm and 3 minutes at 127 rpm.

As shown in the table below, the amount of flour and water were varied. Samples of each batch of dough were then tested on an Instron universal testing instrument. The Instron was equipped with a load cell adapter, load cell and piston. The piston was fitted to an Allo-Kramer extrusion cell, Model C-10 fitted with a ⅜-inch orifice plate (manufactured by Food Technology Corp.). The cross head speed of the Instron was adjusted to 5 inches per minute as was the recording chart speed. A 150-gram sample of dough was placed in the extrusion cell. The cross head was set so that the bottom of the piston was 0.225 inches above the top of the extrusion cell and the gauge length was set to return at 3 inches. The piston was allowed to run down into the extrusion cell and the pounds average maximum force and the work were recorded. Work is expressed herein in inch-pounds.

The doughs were run at varying times because of the increase in viscosity of the dough due to hydration of

TABLE 6

| Batch | Flour % | Water % | Time-To-Peak Development minutes | Farinograph$^{Min.}$ B.U. | Farinograph$^{Max.}$ B.U. | Comments |
| --- | --- | --- | --- | --- | --- | --- |
| 1 (Control) | 44.866 | 27.066 | 25 | 270 | 550 | Extruded very well. |
| 2(a) | 42.866 | 29.066 | 22 | 375 | 440 | Extruded very well but was only marginally extensible. |
| 2(b) | 42.866 | 29.066 | 8 | 440 | 505 | Did not extrude. |
| 3 | 40.866 | 31.066 | 68 | 140 | 375 | Ran well but was not sufficiently extensible to hold its own weight. |
| 4 | 48.866 | 23.066 | 15 | 530 | 840 | Extruded fairly well in a smooth sheet. |
| 5 | 50.866 | 21.066 | 20 | 610 | 920 | The dough was too dry to feed properly and would not form a smooth sheet. |

EXAMPLE I

A second dough formulation was prepared containing the following ingredients:

| INGREDIENTS | PER CENT BY WEIGHT |
| --- | --- |
| Flour | 30.200 | the flour and cornmeal. The times presented in this example are 10 minutes and 30 minutes. The temperature of the dough in the extrusion cell was about 60° F.

When using the Instron test as set forth above, the work required to extrude satisfactory dough ranges from 200 to 850 inch-pounds. To obtain good final product, the work required should range from 200 to 600 inch-pounds.

TABLE 7

| Batch | Flour % | Water % | Time Out of Mixer (Floor Time) | Pounds Average Maximum Force | Work Inch-Pounds | Comments |
| --- | --- | --- | --- | --- | --- | --- |
| 1 | 30.200 | 24.550 | 10 | 178 | 225.5 | |
| | | | 30 | 260 | 286.5 | Extrudes well. |
| 2 | 32.200 | 22.550 | 10 | 395 | 508 | Extrudes well; final product |

TABLE 7-continued

| Batch | Flour % | Water % | Time Out of Mixer (Floor Time) | Pounds Average Maximum Force | Work Inch-Pounds | Comments |
|---|---|---|---|---|---|---|
|   |        |        | 30 | 390 | 568.5 | slightly dry but marginally satisfactory. |
| 3 | 34.700 | 20.550 | 10 | 500 | 662.5 | Extrudes satisfactorily but product baked |
|   |        |        | 30 | 595 | 798.5 | therefrom is too dry and exceedingly crumbly. |
| 4 | 27.200 | 27.550 | 10 | * | 157 | At 10 minutes floor time the dough flows |
|   |        |        | 30 | * | 280.6 | and is unsatisfactory. At 30 minutes, it will retain its shape. Marginally satisfactory at 30 minutes. |
| 5 | 26.200 | 28.550 | 10 | * | 90 | The dough flows; unsatisfactory because |
|   |        |        | 30 | * | 178.8 | dough piece cannot be formed. |

*Not Read.

EXAMPLE VII

A dough line was constructed from equipment similar to that shown in FIG. 1. The first and third extruders were three-roll cream or jam spreaders manufactured by Simon-Vicars Ltd. and the second extruder was a two-roll extruder, Type UR, manufactured by Thomas L. Green. In addition to that equipment, the line was equipped with a dough cutter, a dough oiler and a packer. A horizontal straight bar dough mixer was used to mix the first dough and a horizontal Sigma bar dough mixer was used to mix the second dough.

The formulation for the first dough and the second dough is set forth below:

| INGREDIENTS | PER CENT BY WEIGHT | |
|---|---|---|
|  | First dough* | Second Dough |
| Flour | 46.558 | 30.200 |
| Water | 25.374 | 24.550 |
| Shortening | 18.000 | 7.500 |
| Buttermilk solids | — | 2.250 |
| Nonfat dry milk solids | 3.000 | — |
| Leavening, SAPP | .818 | .750 |
| Leavening, SALP | .600 | .550 |
| Leavening, soda | 1.200 | 1.100 |
| Sugar | 3.000 | 4.000 |
| Salt | 1.200 | 1.500 |
| Cornmeal | — | 21.600 |
| Shortening chips | — | 6.000 |
| Color solution | 0.150 | — |

*First dough contains 0.100 per cent by weight potassium sorbate.

When mixing the first dough, the flour, water, shortening (which had been previously melted) and color solution are added to the mixer and mixed for one-half minute at a low speed and 3½ minutes at a high speed. The remaining ingredients are added and the dough is mixed for one-half minute at a low speed and for 3 minutes at a high speed. The temperature of the dough is maintained between 60° F. and 65° F. At the end of mixing, the dough had a minimum Farinograph value of 325 BU, a time-to-peak development of 30 minutes and a maximum Farinograph value of 575 BU.

The second dough was prepared by adding all of the ingredients except shortening chips and cornmeal to the Sigma bar mixer and mixing for one-half minute at low speed and for 3 minutes at high speed. The cornmeal and shortening chips were subsequently added and the dough was again mixed for one-half minute at low speed and 1 minute at high speed. The temperature of the dough was maintained between 60° F. and 65° F. This dough had a minimum Farinograph value of 350 BU. When mixed in the Farinograph for about 15 minutes, no substantial development was noticed in the second dough.

The first dough was divided equally between the extruders for the top and bottom layers and the second dough was placed in the extruder for the inner layer.

The belt speed was adjusted to 7½ feet per minute and the extruders were synchronized with the belt. The applicator before the first extruder was filled with cornmeal and this was applied to the moving belt. The first dough was extruded from the first extruder in a smooth sheet approximately one-eighth inch in thickness. The second dough was deposited thereon from the second extruder in a thickness of about 1 inch. Both knurled extruding rolls of the second extruder was constantly dusted with flour to prevent sticking of this second dough to the rolls. Excess flour was removed from the top of this dough with a rotating brush and a top layer of first dough was extruded from the third extruder. The top of this dough sheet was sprinkled with corn flour and then the dough sheet was passed through a compression roll to reduce the thickness of the dough sheet to about 1 inch. Subsequently the dough sheet was again reduced to between about five-eighths inch and three-fourths inch and a light coating of food grade oil was sprayed thereon as an additional separating aid. The product was then cut and packed by methods well known in the industry.

After refrigerated storage for 45 days, the dough product was acceptable within the parameters previously outlined.

What is claimed is:

1. Fresh corn bread dough having a top and bottom layer of a first dough and an inner layer of a second dough; said first dough comprising from 10% to 30% by weight of said corn bread dough and said second dough comprising from 70% to 90% by weight of said corn bread dough;

said first dough being substantially undeveloped having a minimum Farinograph value of from 200 to 550 BU and a time-to-peak development of at least 15 minutes, and comprising flour, shortening and water; and, said second dough being substantially undevelopable and comprising flour, cornmeal, shortening and water.

2. The fresh corn bread dough of claim 1 wherein said first dough, has a minimum Farinograph value of from 200 to 550 BU and a time-to-peak development of from 15 to 50 minutes.

3. The fresh corn bread dough of claim 2 wherein the second dough requires a work of extrusion of from 200 to 850 inch-pounds when said second dough, at about 60° F., is extruded through a ⅜-inch orifice at the rate of 5 inches per minute.

4. The fresh corn bread dough of claim 3 which has a separating agent applied to at least one surface thereof.

5. The fresh corn bread dough of claim 4 wherein said first dough comprises from 43 to 53 parts flour, from 12 to 21 parts shortening and from 23 to 30 parts water.

6. The fresh corn bread dough of claim 5 wherein said second dough comprises from 26 to 35 parts flour, from 16 to 26 parts cornmeal, from 6 to 23 parts shortening, from 2 to 11 parts sugar and from 18 to 29 parts water.

7. The fresh corn bread dough of claim 6 wherein the shortening used in said second dough is comprised of melted shortening and shortening chips in a weight ratio of melted shortening to shortening chips of from 70:30 to 50:50.

8. A process for preparing a layered dough sheet suitable for cutting into dough pieces and packing in refrigerated dough containers comprising the steps of:
   a. extruding a bottom layer of a substantially undeveloped first dough in a thickness of from one-sixteenth inch to one-fourth inch on a conveying means; said first dough having a minimum Farinograph value of from 200 to 550 BU and a time-to-peak development of from 15 to 50 minutes;
   b. extruding an inner layer of a substantially undevelopable second dough in a thickness of from one-half inch and 2 inches on said botton layer; said second dough after mixing exhibiting essentially no differential between its minimum Farinograph value and its maximum Farinograph value in 15 minutes Farinograph time and requiring a work of extrusion of from 200 to 850 inch-pounds when said second dough, at about 60° F., is extruded through a ⅜-inch orifice at the constant rate of 5 inches per minute;
   c. extruding a top layer of a substantially undeveloped first dough in a thickness of from one-sixteenth inch to one-fourth inch on said inner layer; said dough forming said top layer having a minimum Farinograph value of from 200 to 550 BU and a time-to-peak development of from 15 to 50 minutes; and,
   d. bonding the layers together.

9. The process of claim 8 wherein the minimum Farinograph value of said first dough, is from 290 to 400 BU.

10. The process of claim 9 wherein said first dough has a time-to-peak development of from 20 to 30 minutes.

11. The process of claim 10 wherein said first dough has a maximum Farinograph value of from 400 to 850 BU.

12. The process of claim 11 wherein said second dough requires a work of extrusion of from 200 to 850 inch-pounds wherein said second dough, at about 60° F., is extruded through a ⅜-inch orifice at the rate of 5 inches per minute.

13. The process of claim 12 wherein the maximum Farinograph value is from 500 to 650 BU.

14. The process of claim 8 wherein said first dough comprises from 43 to 53 parts flour, from 12 to 21 parts shortening and from 23 to 30 parts water and wherein said second dough comprises in parts by weight:
   a. from 26 to 35 parts of wheat flour;
   b. from 16 to 26 parts of cornmeal;
   c. from 6 to 23 parts of shortening;
   d. from 2 to 11 parts of sugar;
   e. water in an amount sufficient to provide a dough; and,
   f. chemical leavening.

15. The process of claim 8 wherein said first dough comprises from 46 to 49 parts flour, from 16 to 20 parts shortening and from 23 to 30 parts water and having a flour-to-water ratio of from 1.5:1.8 and wherein said second dough comprises from 28 to 33 parts flour, from 16 to 26 parts cornmeal, from 3 to 10 parts sugar, from 6 to 23 parts shortening, from 20 to 27 parts water and 2.5 parts chemical leavening.

16. The cornbread dough of claim 1 divided into dough pieces and packed in refrigerated dough containers, said dough pieces being stable under refrigerated storage conditions for at least 45 days.

17. The cornbread dough of claim 4 divided into dough pieces and packed in refrigerated dough containers, said dough pieces being stable under refrigerated storage conditions for at least 45 days.

* * * * *